(No Model.)

W. P. GOINS.
CORN PLANTING ATTACHMENT.

No. 479,269. Patented July 19, 1892.

Witnesses.
A. Ruppert.
H. A. Daniels

Inventor.
Wm. P. Goins,
Per
Thomas P. Simpson,
Atty

THE NORRIS PETERS CO., PHOTO-LITHO., WASHINGTON, D. C.

UNITED STATES PATENT OFFICE.

WILLIAM P. GOINS, OF PARAGOULD, ARKANSAS.

CORN-PLANTING ATTACHMENT.

SPECIFICATION forming part of Letters Patent No. 479,269, dated July 19, 1892.

Application filed March 18, 1892. Serial No. 425,419. (No model.)

*To all whom it may concern:*

Be it known that I, WILLIAM P. GOINS, a citizen of the United States, residing at Paragould, in the county of Greene and State of Arkansas, have invented certain new and useful Improvements in Corn-Planting Attachments; and I do hereby declare the following to be a full, clear, and exact description of the invention, such as will enable others skilled in the art to which it appertains to make and use the same.

The special object of the invention is to make an attachment for cultivators or shovel-plows by which corn may be conveniently planted in checks, drilled, or replanted with one man and a horse.

Figure 1:
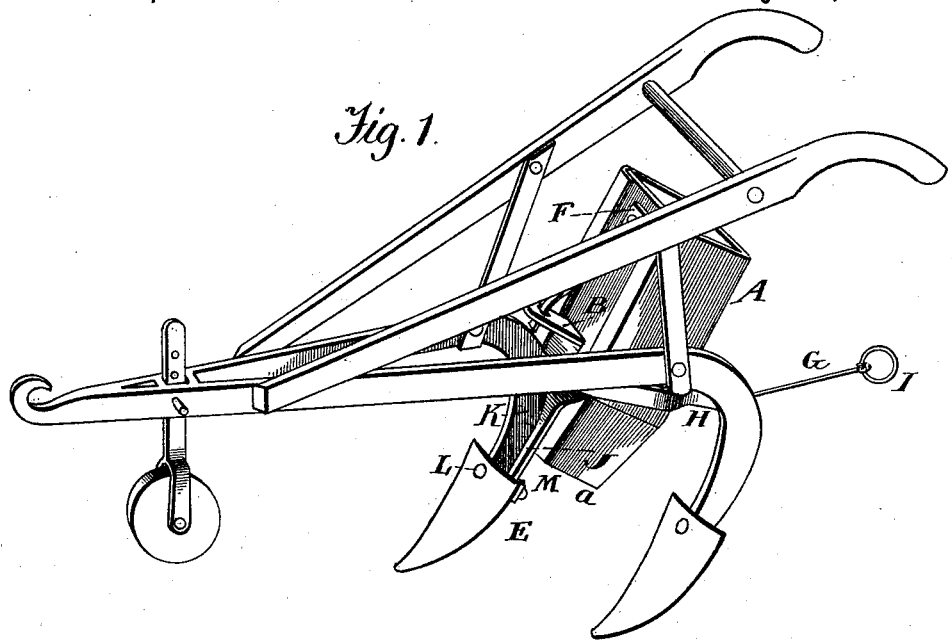
Figure 2:
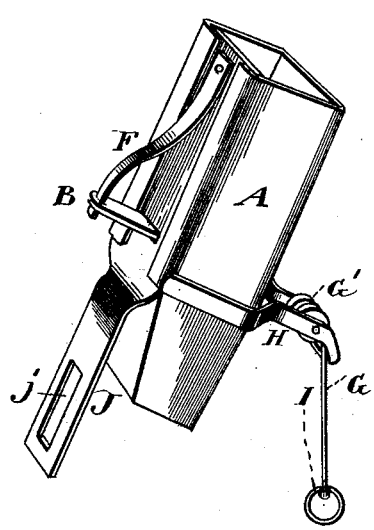
Figure 3:
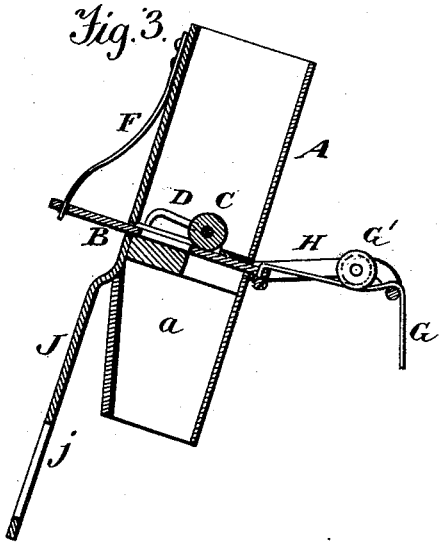

Figure 1 of the drawings is a perspective view showing the seed-dropper attached to the standard of the front plow; Fig. 2, a detail view of the dropper, and Fig. 3 a vertical section thereon.

In the drawings, A represents the seed-hopper, which has the bottom $a$, wherein reciprocates the dropper-slide B under a roller C, which turns on and is held down by a spring D, fastened at its front end to said bottom. The bottom $a$ and slide B have corresponding holes, which register and allow the corn to drop through the lower end of the hopper behind the plow E, which is opening the seed-furrow. The quantity dropped at one time is determined by the size of the cavity or seed-cup in the slide, which passes under the roller C. The latter limits the seed dropped at one time to a cup "level full," while it also prevents the seed from clogging in the outlet.

The slide B extends through the front and rear of the hopper A, being held at one end by a spring F and at the other by a pull-cord G. The latter passes under a grooved roller G', journaled in a double metallic clip H, fastened at each end to the side of the hopper, and has on its outer free end a ring I, which is slipped on one of the fingers of the operator. The front plow opens the furrow, the slide drops the seed, and the rear plow covers it with fine soil.

On the front of the hopper A is fastened the plate J, which extends below the hopper, is slotted at $j$, and is secured to standard K by the same screw-bolt and nut L M which secure the shovel N to the standard.

I may provide the beam of plow with an adjustable roller to regulate the depth of the furrow and attach a sack of seed-corn to the top of receiver, so as to fill it up to the proper extent whenever necessary.

Having thus described all that is necessary to a full understanding of my invention, what I claim as new, and desire to protect by Letters Patent, is—

The hopper, spring-retracted dropper-slide, roller-spring held on the slide, clip-carrying roller, and a cord attached to slide, all combined and arranged as shown and described.

In testimony whereof I affix my signature in presence of two witnesses.

WILLIAM P. GOINS.

Witnesses:
J. D. SPENCER,
F. R. CLARK.